United States Patent [19]

Katsumata et al.

[11] Patent Number: 4,733,297
[45] Date of Patent: Mar. 22, 1988

[54] VIDEO SIGNAL PROCESSING CIRCUIT OF MOTION ADAPTIVE TYPE

[75] Inventors: Kenji Katsumata; Masato Sugiyama; Akihide Okuda; Shigeru Hirahata; Isao Nakagawa, all of Yokohama; Sunao Suzuki, Kamakura, all of Japan

[73] Assignee: Hitachi Ltd. & Hitachi Video Eng., Tokyo, Japan

[21] Appl. No.: 36,431

[22] Filed: Apr. 9, 1987

[30] Foreign Application Priority Data

Apr. 9, 1986 [JP] Japan ................... 61-79976

[51] Int. Cl.⁴ .............................. H04N 5/14
[52] U.S. Cl. .................. 358/105; 358/21 R; 358/160
[58] Field of Search ............ 358/105, 21 R, 160, 358/166, 167

[56] References Cited

U.S. PATENT DOCUMENTS

| | | | |
|---|---|---|---|
| 4,543,607 | 9/1985 | Taylor | 358/105 |
| 4,626,891 | 12/1986 | Achiha | 358/21 R |
| 4,636,862 | 1/1987 | Hatori | 358/166 |
| 4,639,767 | 1/1987 | Suzuki | 358/21 R |
| 4,641,180 | 2/1987 | Richter | 358/105 |

FOREIGN PATENT DOCUMENTS 58-177078 10/1983 Japan .

Primary Examiner—Howard W. Britton
Attorney, Agent, or Firm—Antonelli, Terry & Wands

[57] ABSTRACT

A video signal processing circuit of motion adaptive type includes a circuit for identifying motion of a picture in a video signal on the basis of a difference signal between at least a line signal appearing in an M-th field and a corresponding line signal appearing in an (M-1)th field so that, when a scanning line produced on the basis of the video signal is interpolated between scanning lines of the video signal to improve the picture quality, a signal for interpolating said scanning line is produced in a different manner depending on whether a portion of the video signal to the displayed is a still picture or a moving picture. The motion identifying circuit comprises a horizontal filter spreading the difference signal in the horizontal direction, a circuit delaying the output signal of the horizontal filter by one field after attenuation, a line memory delaying the output signal of the attenuating and delaying circuit by one line, and an output circuit generating a signal identifying the motion of the picture on the basis of the output signals of the horizontal filter, attenuating and delaying circuit and line memory.

15 Claims, 25 Drawing Figures (M−2)TH FIELD (M−1)TH FIELD

M-TH FIELD (M+1)TH FIELD

TIME

HORIZONTAL DIRECTION

QUANTITY OF MOTION IN M-TH FIELD

HORIZONTAL PROCESSING OF FIG. 4B

QUANTITY OF MOTION IN (M−1)TH FIELD

HORIZONTAL PROCESSING OF FIG. 4D

MAXIMUM VALUES OF FIG. 4C AND 4E

VIDEO SIGNAL PROCESSING CIRCUIT OF MOTION ADAPTIVE TYPE

BACKGROUND OF THE INVENTION

This invention relates to a video signal processing circuit for use in color television for processing a video signal according to motion of a picture. More particularly, this invention relates to a Y/C separation circuit separating a video signal into a luminance signal and a color signal, in a television signal processing circuit in which a scanning line is interpolated between scanning lines of a television signal of interlace system to double the number of scanning lines to be used in a line sequential color television system, a video signal processing circuit of motion adaptive type in which Y/C separation or generation of an interpolation scanning signal can be appropriately achieved depending on whether a picture is a still picture or a moving picture.

The operation of a Y/C separation circuit is such that, in the case of a still picture, a luminance signal and a color signal are separated by arithmetic operation with a video signal applied in the preceding frame, while, in the case of a moving picture, the luminance signal and the color signal are separated by arithmetic operation with the video signal of the same field. When the Y/C separation is made according to the interframe arithmetic operaiton in the case of a moving picture, the absence of interframe correlation results in occurrence of interference. Therefore, on the basis of a detection output signal of a motion detecting circuit discriminating whether a picture is a still picture or a moving picture on the basis of difference signal between a present signal and a signal earlier by one frame or more frames, the mixing ratio between the Y/C separation output obtained by the arithmetic operation between the frames and the Y/C separation output obtained by the arithmetic operation in the same field is preferably controlled to produce a luminance signal and a color signal of high picture quality. Such a method is already known.

When a picture to be displayed is a still picture in the case of scanning line interpolation, a line signal representative of a scanning line appeared in a preceding field earlier by one field than the present field can be directly interpolated between scanning lines. However, when a picture to be displayed is a moving picture, interpolation of a scanning line on the basis of a line signal appeared in the preceding field is not satisfactory in that continuous motion of part of the picture within 1/60 seconds results in undesirable degradation of the quality of that part of the picture. Therefore, in the case of a moving picture, it is a common practice that an average of scanning lines upper and lower than the specific scanning line in the same field is based to determine the interpolating scanning line. In this connection, it is known that, on the basis of a detection output signal of a motion detecting circuit identifying whether a picture is a moving picture or a still picture by detecting the difference between a line signal appeared in a field earlier by one frame or more frames and a line signal appearing in the present field, the mixing ratio between the line signal appeared in the preceding field and an average signal of a line signal appeared at time earlier by one scanning line and that of the present scanning line is controlled to improve the quality of the picture.

A technique for displaying a picture of high quality by processing a color television signal is disclosed in, for example, No. JP-A-58-177078. The object of the above publication is to lessen cross color interference, dot crawl interference and the like attributable to frequency multiplexing superposition of a color signal on a luminance signal and to prevent interference such as line flickering occurring at edges of lateral fringes due to the interlace scanning and also to prevent lowering of the resolution. In order to improve the quality of a still picture, a Y/C separation circuit (or a frame comb circuit) is required, which utilizes the fact that the subcarrier is frequency interleaved and in which a Y signal (the luminance signal) and a C signal (the color signal) are separated from each other on the basis of the difference signal between frames. In addition to the Y/C circuit, it is necessary to interpolate a scanning line using the one appeared in the preceding field. However, in the case of a moving picture, there is not always a coincidence between frame signals. In such a case, the Y/C separation and the interfield scanning line interpolation will rather degrade the picture quality. Therefore, a signal processing circuit of motion adaptive type is utilized in which, when a picture is detected to be a still picture, Y/C separation by Y/C separation circuit and interfield scanning line interpolation are carried out as described above, but, when the picture is detected as a moving picture, signal processing is always carried out in the same field.

A composite color television signal is an interlace signal, and its subcarrier is frequency interleaved. Therefore, the arrangement of scanning lines of the television signal is as shown in FIG. 2 in which the horizontal axis represents time, and the vertical axis represents scanning lines arranged in a direction vertical to the screen, that is, vertical to the drawing sheet. In FIG. 2, the arrow indicates the phase of the subcarrier. It will be seen from FIG. 2 that, when motion of a picture between frames is detected on defferent scanning lines, such motion is always detected at a vertical edge portion, and, therefore, motion is commonly detected on the basis of difference signal between a present signal and a signal earlier by one frame or more frames.

The prior art circuit described above can make optimum Y/C separation and scanning line interpolation thereby improving the picture quality when motion of a picture is accurately detected. However, when motion of a picture is very quick, motion detection according to the interframe difference signal may make errors in detection of the motion of the picture, and various interference as described above occur when the Y/C separation and the scanning line interpolation are carried out on the basis of the erroneous motion information.

Consider now, for example, a scanning line interpolation circuit of motion adaptive type. FIG. 3 shows schematically that a black body having a size corresponding to three lines moves from a lower position toward an upper position on a screen. In FIG. 3, the horizontal axis represents time, and the vertical axis represents the vertical direction. Symbols $S_0$ designates a present scanning line signal, $S_1$ designates a scanning line signal appeared at time earlier by 1H than the present time, and so on. It will be apparent from FIG. 3 that motion information for providing an interpolation signal of an M-th field illustrated by a square mark is produced on the basis of a line signal $S_{525}$ of an (M−1)th field and a line signal $S_0$ of an (M+1)th field. However, since the picture in the form of the black rectangle moves quickly in the vertical direction in one field period as shown in FIG. 3, there is not any substantial difference between the line signal $S_{525}$ of the (M−1)th field and the line signal $S_0$ of the (M+1)th field, and the picture appearing in the M-th field is decided as a still picture. Therefore, the interpolation signal of the M-th field is produced as a bright signal from the bright signals of the (M−1)th and (M+1)th fields, and a problem arises such that the square mark which should be a black picture element is interpolated as a bright part.

SUMMARY OF THE INVENTION

It is an object of the present invention to provide a video signal processing circuit of motion adaptive type which can accurately detect finest motion of a picture and more accurately attain Y/C separation or scanning line interpolation depending on a still picture or a moving picture thereby improving the quality of the picture.

According to the present invention, a signal indicative of a first quantity, of motion detected on the basis of a difference signal between a signal of the present field and a signal of a corresponding picture element appeared in a preceding frame earlier by one frame or more frames is delayed by one field and, after sequentially delaying the first motion quantity signal and/or the delayed first motion quantity signal in a horizontal filter, the delayed signals are synthesized in the horizontal filter to be converted into a signal indicative of a second quantity of motion, this second motion quantity signal being based to detect the motion of the picture and to control the motion adaptive type circuit.

DESCRIPTION OF THE PREFERRED EMBODIMENTS

First of all, the concept of the present invention will be described.

Since a motion detecting circuit detects motion of a picture on the basis of interframe difference information, a problem as pointed out already arises in a processing circuit of motion adaptive type. In a motion quantity processing circuit used in the present invention, a signal indicative of a first quantity of motion detected by a motion detecting circuit is delayed by about one field period, and the first motion quantity signal and/or the one-field delayed first motion quantity signal are applied to a horizontal filter in which the signal or signals are sequentially delayed and synthesized. The signal processing in this horizontal filter proceeds along the time base. Therefore, a quantity of motion of a picture at a certain time is expressed as a function of quantities of motion at a plurality of points in the direction of the time base. That is, a quantity of motion of a picture at time t is expressed as a function of quantities of motion at times t-1, t-2, t-3, . . . .

Therefore, the range of data determining the quantity of motion of the picture at the time t spreads with a certain time constant in the direction of the time base. Further, since the signal indicative of the quantity of motion of the picture detected in the preceding field is also synthesized to provide the signal indicative of the second quantity of motion, and, also, since the scanning lines in one field are displaced from those in the other field due to the interlace scanning, the range of data determining the quantity of motion at the specific time spreads with a certain time constant in the vertical direction. That is, besides a signal indicative of the motion quantity based on the difference between the point $S_0$ and the point $S_{525}$ in the preceding frame, signals indicative of quantities of motion at points $S_{262}$ and $S_{263}$ on an upper and a lower scanning line in the same field are also used as signals for controlling an interpolation signal corresponding to the square marked point in FIG. 3. Therefore, the picture moving in a mode as shown in FIG. 3 is not erroneously decided as a still picture, and the required scanning line interpolation is accurately carried out.

Figure 3:
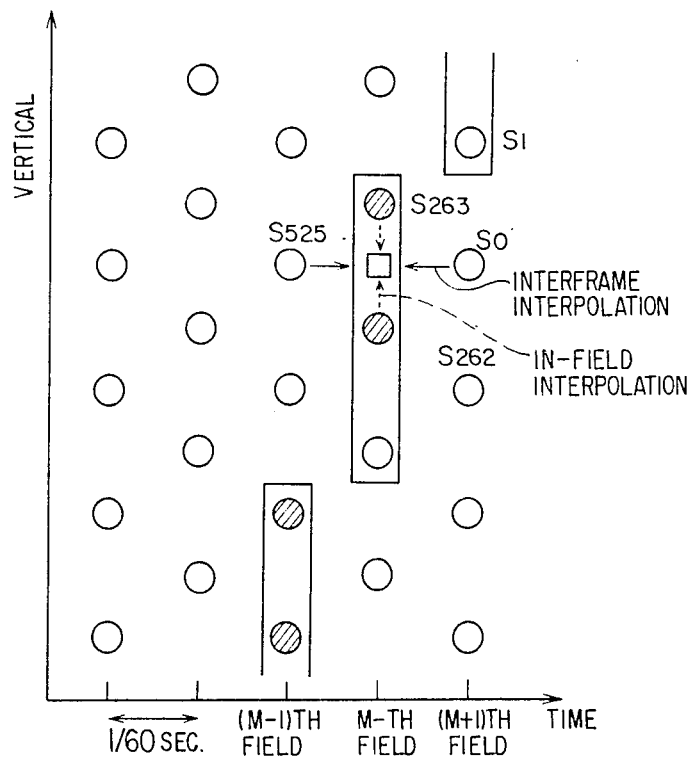
FIG. 3 is a graph schematically showing a manner of scanning line interpolation.
Figures 4A, 4B, 4C, 4D, 4E, 4F:
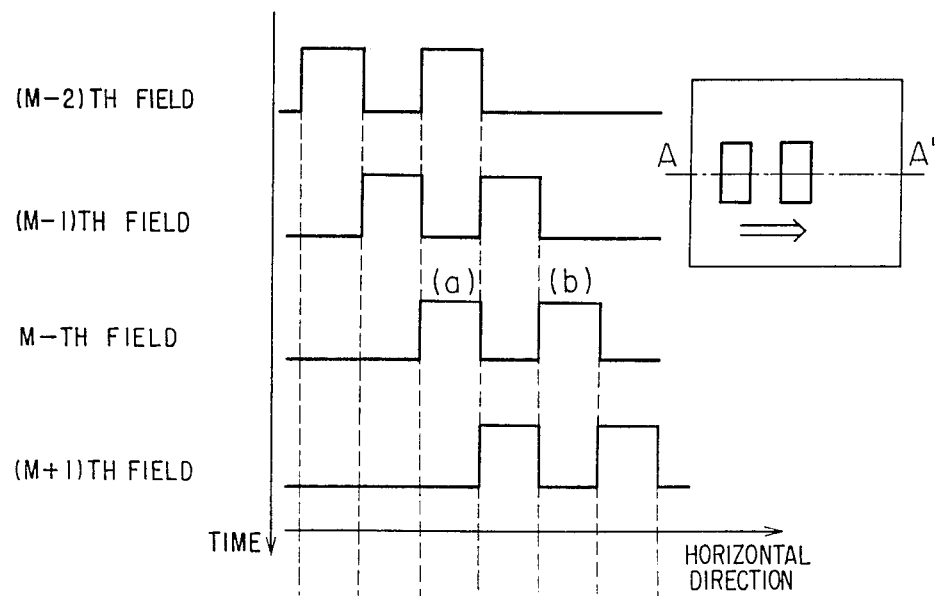
FIGS. 4a, 4b, 4c, 4d, 4e and 4f show schematically a manner of motion processing using the horizontal filter.

In contrast to FIG. 3 which illustrates motion in the vertical direction, FIG. 4A illustrates motion in the horizontal direction. That is, FIG. 4A illustrates a signal waveform showing two bodies which move from the left toward the right in such a relation that their positions in one field are displaced from those in the preceding field, and one of them overlaps the other in each frame. When now a signal waveform indicating the quantities of motion required for interpolation of scanning lines of the M-th field is to be determined on the basis of those in the (M+1)th and (M−1)th fields shown in FIG. 4A, the required signal waveform is given by the absolute value of the difference between those of the (M+1)th and (M−1)th fields as shown in FIG. 4B. Therefore, in the resultant signal waveform, a region including zero motion portions (a') and (b') (that is, still picture portions) appears between the moving picture portions (a) and (b), and erroneous interpolation will be effected. When the signal waveform shown in FIG. 4B is processed by a horizontal filter, a signal waveform as shown in FIG. 4C is obtained. It will be seen in FIG. 4C that the waveform is equivalent to one in which the quantities of motion are stretched in the horizontal direction, and the portions having been judged to be the still picture portions in FIG. 4B are reduced in FIG. 4C.

A signal waveform indicating the quantities of motion in the preceding field, that is, the (M−1)th field is further determined on the basis of the difference between those in the (M−2)th and M-th fields, as shown in FIG. 4D. The signal waveform shown in FIG. 4D is processed by a horizontal filter to obtain a signal waveform as shown in FIG. 4E. A signal waveform including the maximum values of the signal waveforms shown in FIGS. 4C and 4E is shown in FIG. 4F, and this signal waveform is employed as being representative of the quantities of motion in the M-th field. In this manner, the moving picture portions of the M-th field shown in FIG. 4A are substantially completely included in the moving picture portions shown in FIG. 4F, and interference attributable to erroneous scanning line interpolation can be greatly reduced.

Figure 1A:
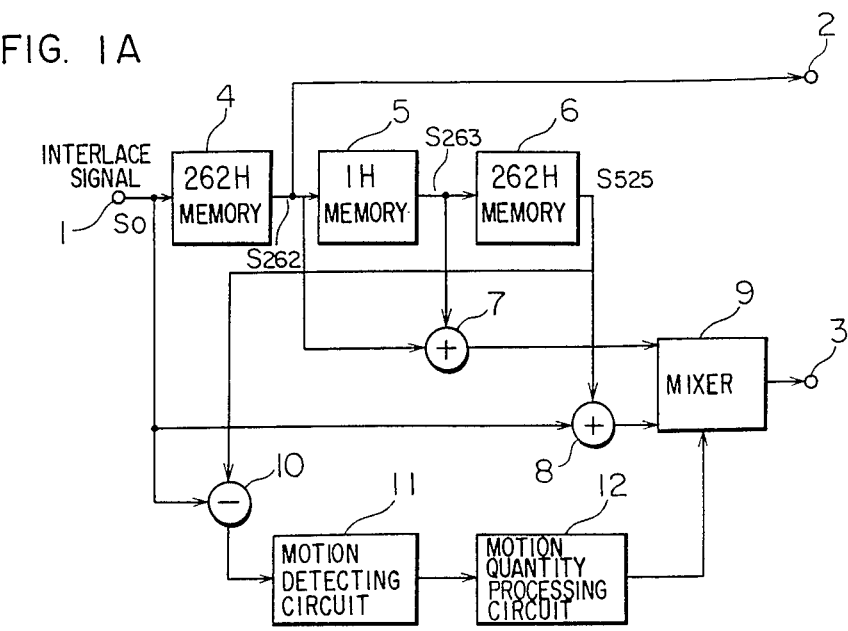
FIG. 1A is a block diagram showing one form of a system construction using the present invention.

An embodiment of the present invention will now be described with reference to FIGS. 1A to 1C. Referring first to FIG. 1A, a system to which the present invention is applied includes a digital interlace signal input terminal 1, a real scanning line signal output terminal 2, an interpolation scanning line signal output terminal 3, a first and a second field memory 4 and 6, a first 1H memory 5 for delaying the output signal of the field memory 4 by one scanning line period, an adder 7 for producing a moving picture interpolation signal, another adder 8 for producing a still picture interpolation signal, a mixer 9 for mixing the moving picture interpolation signal and the still picture interpolation signal according to motion of a picture, a subtractor 10 for producing a interframe difference signal, a motion detecting circuit 11 for detecting an interframe quantity of motion on the basis of the interframe difference signal produced by the subtractor 10, and a motion quantity processing circuit 12 for filtering the first quantity of motion detected by the motion detecting circuit 11 so as to prevent occurrence of a detection error. The signals appearing at the real scanning line signal output terminal 2 and interpolation scanning signal output terminal 3 are time-base compressed in a manner well known in the art and are alternately transmitted to a display part at intervals of horizontal scanning lines to provide a line sequential scanning signal of high picture quality.

Figure 1B:
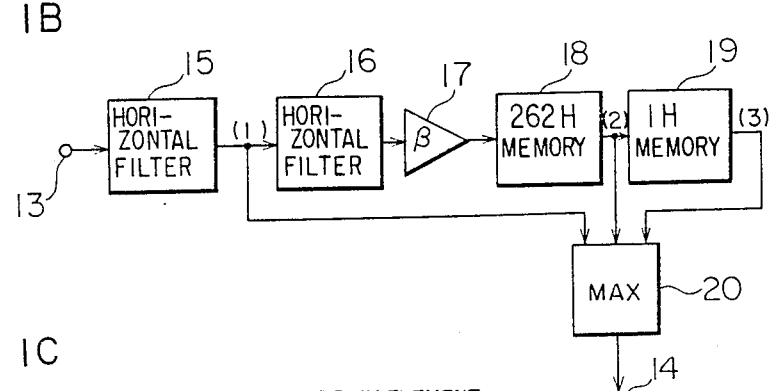
FIG. 1B is a block diagram showing the structure of an embodiment of the present invention incorporated in the system shown in FIG. 1A.

FIG. 1B shows in detail the structure of the motion quantity processing circuit 12 shown in FIG. 1A. Referring to FIG. 1B, the motion quantity processing circuit 12 includes a signal input terminal 13 to which the first motion quantity signal from the motion detecting circuit 11 is applied, a signal output terminal 14 at which a second motion quantity signal appears to control the mixer 9, a first and a second horizontal filter 15 and 16, an attenuator 17 for attenuating the output of the second horizontal filter 16 and emphasizing quantities of motion nearest to an interpolated portion, a third field memory 18 for delaying the output of the attenuator 17 by about 262H, a second 1H memory 19 for delaying the output of the field memory 18 by about 1H, and a maximum value circuit 20 for deriving maximum values of the first horizontal filter 15, third horizontal field memory 18 and second 1H memory 19.

Figure 1C:
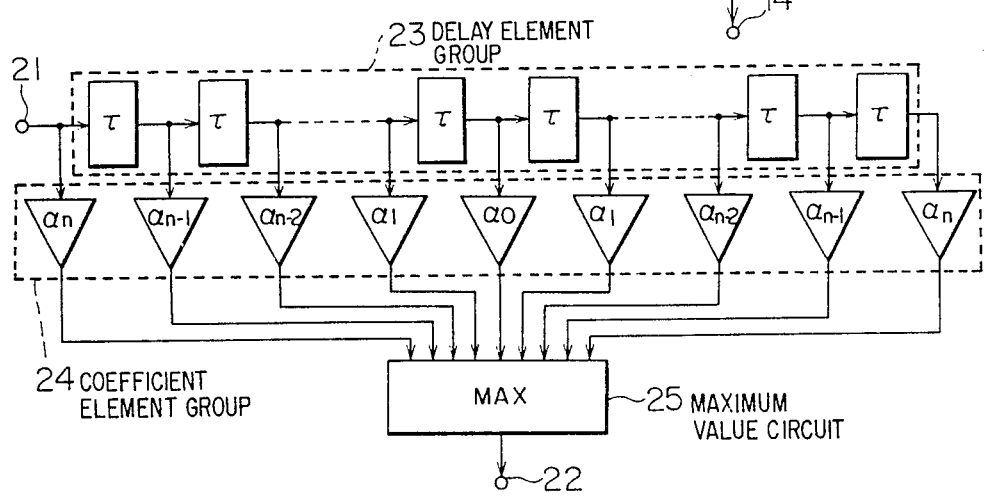
FIG. 1C is a block diagram showing the structure of one form of the horizontal filter which is a principal part of the present invention shown in FIG. 1B.
Figure 2:
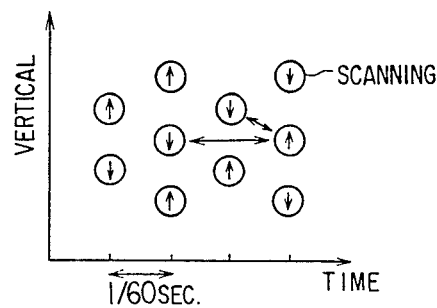
FIG. 2 is a graph schematically showing the concept of detection of motion.

Each of the horizontal filters 15 and 16 shown in FIG. 1B has a structure as shown in FIG. 1C. Referring to FIG. 1C, the horizontal filter includes a signal input terminal 21, a signal output terminal 22, a group of 2n delay elements 23 corresponding to picture elements for sequentially delaying the input signal during horizontal scanning, a group of (2n+1) coefficient elements 24 weighting the taps of the respective delay elements 23, and a maximum value circuit 25 deriving maximum values of outputs of the coefficient elements 24.

The first motion quantity signal applied from the motion detecting circuit 11 to the input terminal 13 of the motion quantity processing circuit 12 shown in FIG. 1B is equivalently stretched in the horizontal direction by the first horizontal filter 15 and appears in a waveform as, for example, shown in FIG. 4C. In the present embodiment, such a horizontally stretched output waveform of the first horizontal filter 15 is further stretched in the horizontal direction by the second horizontal filter 16, and the resultant signal is then multiplied by an attenuation coefficient $\beta$ in the attenuator 17. The output signal of the attenuator 17 is delayed by about one field by the combination of the third field memory 18 and the second 1H memory 19, and the maximum value circuit 20 detects maximum values of the outputs (1), (2) and (3) of the first horizontal filter 15, third field memory 18 and second 1H memory 19 respectively. The output signal of the maximum value circuit 20 controls the mixer 9. Therefore, the control signal for controlling scanning line interpolation at a point in an M-th field is a function of the detected motion quantity represented by the signal (1), n points on either side of the above point in the horizontal direction and 2n points on either side of scanning lines upper and lower than the scanning line of the (M−1)th field and represented by the signals (2) and (3). In other words, when motion occurs at a point in the M-th field, the signal representative of the quantity of motion is stretched to the extent of n points on either side in the horizontal direction in the M-th field and is then stretched to the extent of one line on either side in the vertical direction in the (M+1)th field. The signal is further stretched to the extent of 2n points on either side in the horizontal direction. Therefore, the possibility of effecting erroneous interpolation for motion as shown in FIG. 3 or 4 is reduced to prevent undesirable degradation of the picture quality. Further, the present embodiment employing the horizontal filters for motion processing is advantageous in that change-over between a moving picture display and a still picture display is smoothly attained without giving a sense of disorder to viewers.

In FIG. 1B, the processing circuit 12 is shown to include the maximum value circuit 20. However, this maximum value circuit 20 may be replaced by, for example, an adder. Also, the structure of the horizontal filter is in no way limited to that shown in FIG. 1C, and the maximum value circuit 25 may be replaced by, for example, an adder. The coefficient elements 24 need not be symmetrically arranged. Further, the horizontal filter may have a structure of an IIR type. The embodiment shown in FIG. 1B is referred to as a feed forward type (abbreviated hereinafter as an FF type).

Figure 5:
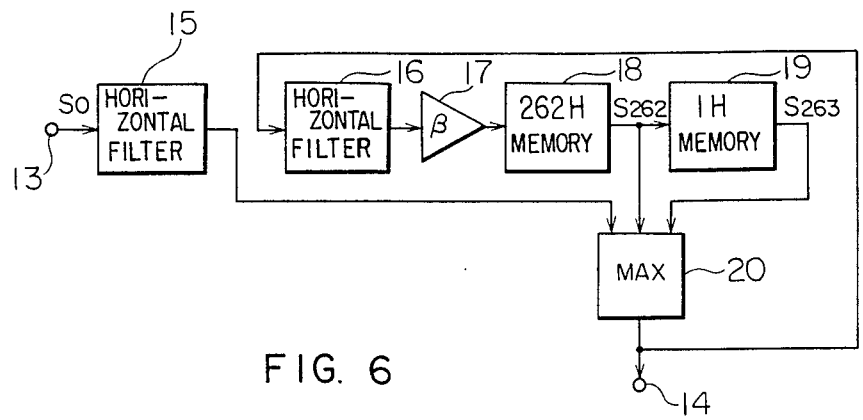
FIGS. 5 to 14 are block diagrams showing the structure of other embodiments of the present invention.

FIG. 5 shows another embodiment of the present invention. In FIG. 5, reference numerals 13 to 20 designate the same elements as those shown in FIG. 1B respectively. The embodiment shown in FIG. 5 is a modification of the FF type shown in FIG. 1B and is referred to as a feedback type (abbreviated hereinafter as an FB type). When motion occurs at a picture element, the signal representing its quantity of motion is stretched by the horizontal filter 15, fed back from the maximum value circuit 20 to be further stretched by the horizontal filter 16, attenuated by the attenuator 17, and, after being dealyed by one field by the field memory 18, applied to the maximum value circuit 20 again. Thus, the quantity of motion is stretched in both the horizontal direction and the vertical direction while being attenuated as the field advances. Therefore, the possibility of making erroneous interpolation of scanning lines is reduced to improve the picture quality.

FIGS. 6 to 14 show other embodiments of the present invention. In these embodiments, the same reference numerals are used to designate the same parts appearing in FIG. 1B. These embodiments are modifications of the circuitry shown in FIG. 1B in that the mode of spread, from one field to another, of motion occurred at a point differs from that of FIG. 1B. In other words, these embodiments differ from one another in the range of motion information used to determine the quantity of motion occurred at a point.

Figure 6:
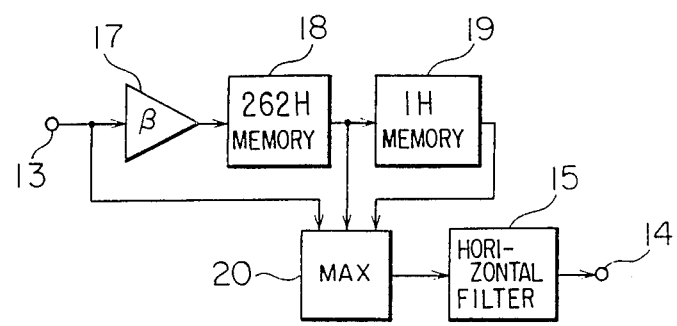

The embodiment shown in FIG. 6 is of the FF type. When motion occurs at a point in an M-th field, the signal representing the quantity of motion is, after attenuation in the attenuator 17, delayed by one field in the field memory 18 and then delayed by one line in the line memory 19. In the (M+1)th field, the signal is stretched to the extent of an upper and a lower line and is then stretched to the extent of n points on either side of the center by the first horizontal filter 15.

Figure 7:
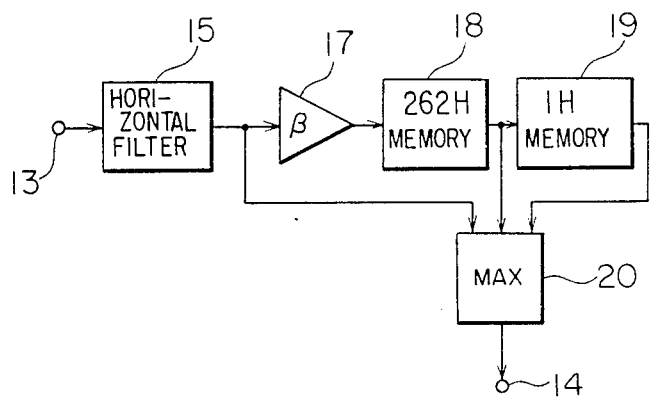

FIG. 7 shows also an embodiment of the FF type and differs from the embodiment shown in FIG. 6 in the position of the horizontal filter 15. However, the mode of spread of the quantity of motion is similar to that in the embodiment shown in FIG. 6.

Figure 8:
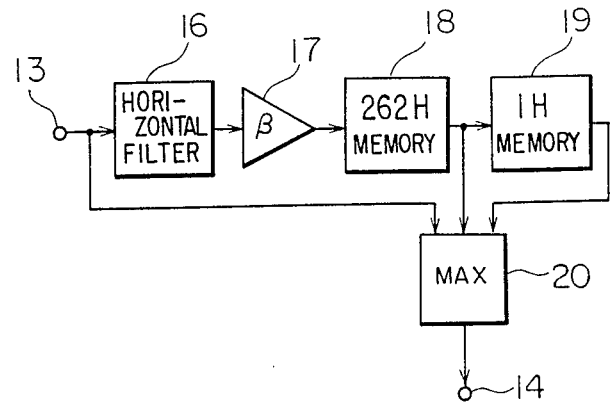

FIG. 8 shows also an embodiment of the FF type. In the embodiment shown in FIG. 8, the first horizontal filter 15 shown in the embodiment of FIG. 7 is eliminated and replaced by the second horizontal filter 16. In the embodiment shown in FIG. 18, the signal representing the quantity of motion in an M-th field is applied to the input terminal 13 to appear at the output terminal 14 through the maximum value circuit 20, and the motion does not spread. In the (M+1)th field, the signal representing the quantity of motion which is stretched in the horizontal filter 16, attenuated by the attenuator 17 and delayed by one field by the field memory 18, is spread in the horizontal direction.

Figure 9:
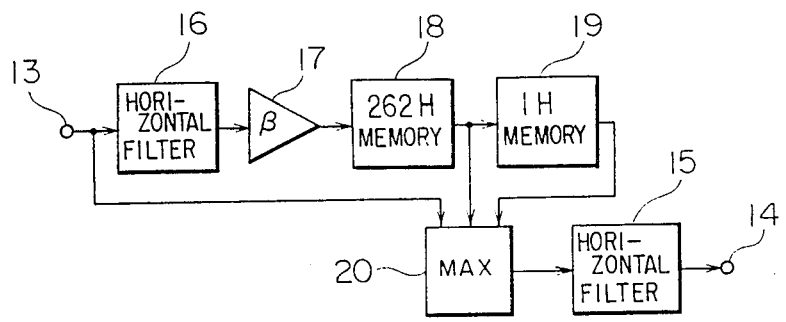

FIG. 9 shows also an embodiment of the FF type and is a modification of the embodiment shown in FIG. 1B in that the first horizontal filter 15 is disposed in the last stage. The mode of spread of the quantity of motion is similar to that of the embodiment shown in FIG. 1B.

Figure 10:
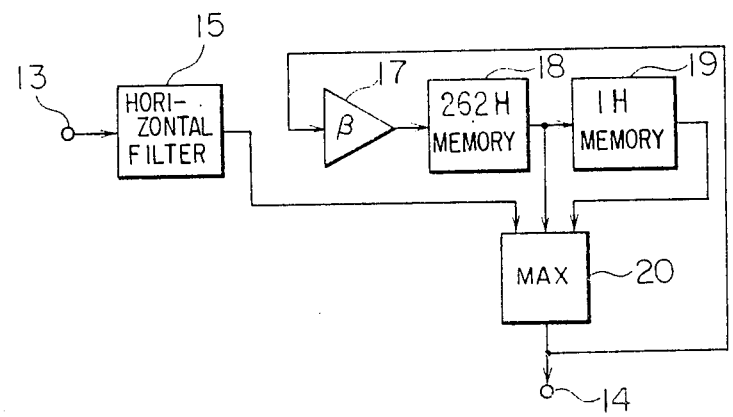
Figure 11:
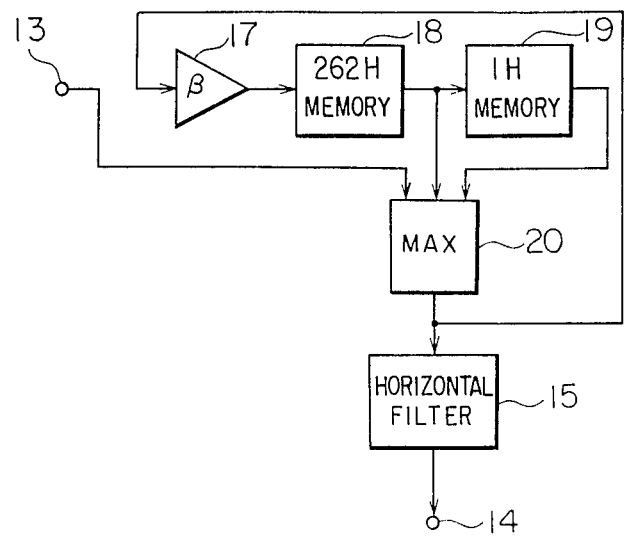

FIG. 10 shows an embodiment of the FB type, and this embodiment is a modification of that shown in FIG. 5 in that the second horizontal filter 16 in the latter is eliminated. In this embodiment of the FB type, the signal representing the quantity of motion stretched in the horizontal direction is attenuated in the attenuator 17 after being passed through the maximum value circuit 20, and, after being delayed by one field by the field memory 18, is further delayed by one line by the line memory 19. Such an operation is repeated, and the quantity of motion spreads at a rate of one line per field while being attenuated according to the predetermined attenuation constant. That is, since the first horizontal filter 15 is disposed outside the feedback loop, the quantity of motion occurred in an M-th field spreads to the extent of n points on either side in the horizontal direction. However, the mode of spread in the horizontal direction in the (M−1)th and succeeding fields is very slight, and the quantity of motion spreads substantially in the vertical direction only. An embodiment shown in FIG. 11 is a modification of that shown in FIG. 10 in that the first horizontal filter 15 is disposed in the last stage. The mode of spread of the quantity of motion is similar to that of the embodiment shown in FIG. 10.

Figure 12:
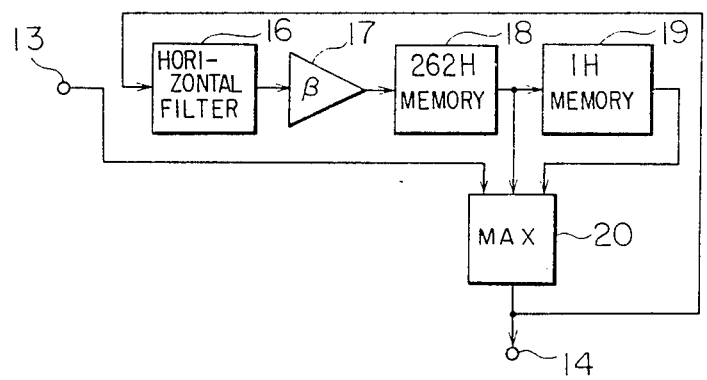

FIG. 12 shows a modification of the FB type shown in FIG. 11. In FIG. 12, the first horizontal filter 15 is eliminated, and the second horizontal filter 16 is provided. The quantity of motion occurred in an M-th field does not spread in the horizontal direction, but spreads in both the horizontal direction and the vertical direction in the (M+1)th and succeeding fields.

Figure 13:
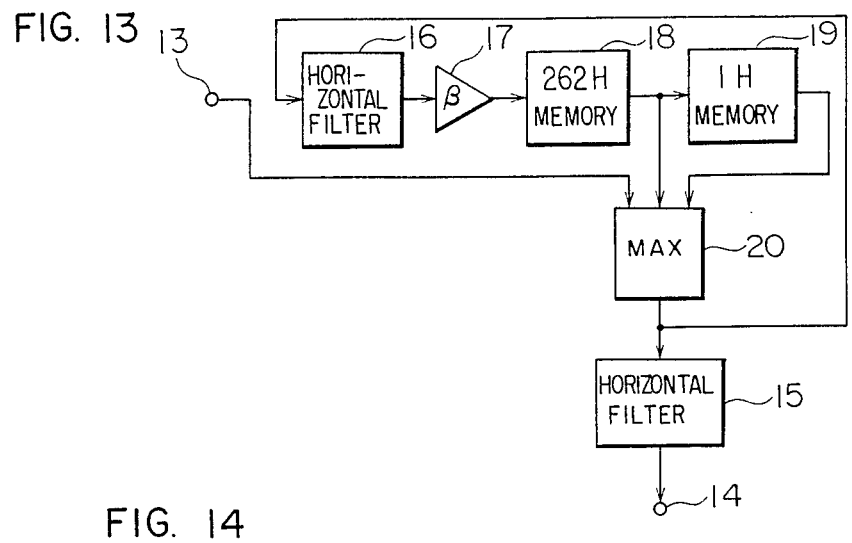

FIG. 13 shows a modification of the embodiment shown in FIG. 5. In FIG. 13, the first horizontal filter 15 is disposed in the last stage, and the mode of spread of the quantity of motion is similar to that of the embodiment shown in FIG. 5.

Figure 14:
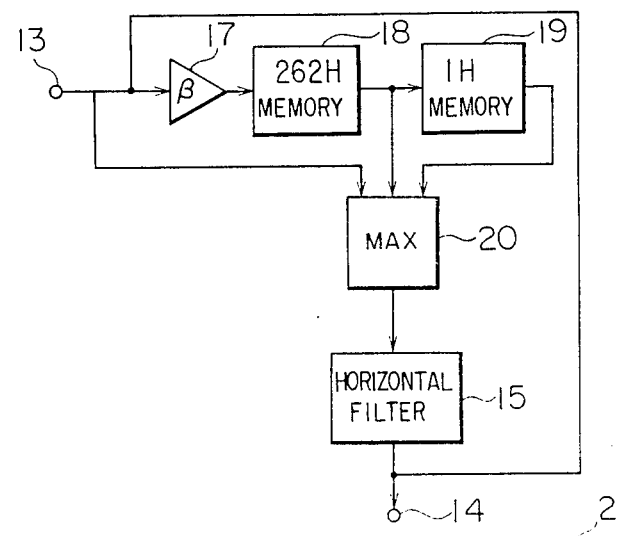

FIG. 14 shows a modification of the embodiment shown in FIG. 13. In FIG. 14, the first and second horizontal filters 15 and 16 are repalced by a single horizontal filter. The mode of spread of the quantity of motion is similar to that of the embodiments shown in FIGS. 5 and 13, and the embodiment shown in FIG. 14 is featured by the fact that one of the horizontal filters can be eliminated.

According to these embodiments, the quantity of motion occurred at a point in an M-th field spreads in both the horizontal direction and the vertical direction in the (M+1)th and succeeding fields. Thus, there is substantially no possibility of mistaking a moving picture to be a still picture, so that undesirable degradation of the picture quanlity can be prevented. The structure of the first and second horizontal filters 15 and 16 is in no way limited to that shown in FIG. 1C, and the maximum value circuit 20 may, for example, be an adder.

Figure 15:
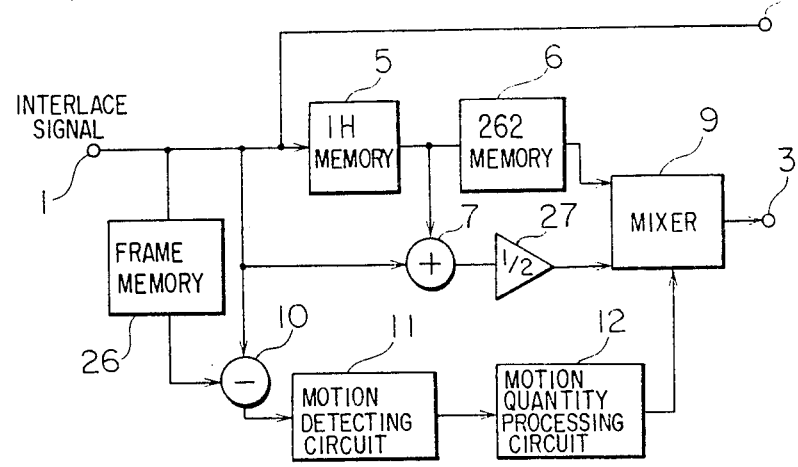
FIG. 15 is a block diagram showing another system construction to which the present invention is applicable.

Any one of the embodiments described above is also applicable to a system as, for example, shown in FIG. 15 in addition to its application to the system shown in FIG. 1A. In FIG. 15, reference numerals 26 and 27 designate a delay circuit delaying a digital interlace input signal by one frame, and a coefficient circuit multiplying a moving picture signal by a coefficient which is ½. In FIG. 15, the same reference numerals are used to designate the same parts appearing in FIG. 1A. In the system shown in FIG. 15, an interpolating scanning line signal to display a moving picture is provided by applying, to the adder 7, scanning line signals $S_1$ and $S_0$ upper and lower than a scanning line signal to be interpolated at a point indicated by a square mark in FIG. 16 and averaging the output signal of the adder 7 by the coefficient circuit 27. On the other hand, in the case of a still picture, the scanning line signal dilayed by one field by the field memory 6 is used to provide the interpolation scanning line signal. Thus, the portion indicated by the square mark in FIG. 16 is interpolated by the still-picture interpolating scanning line signal, and the picture element in the (M−1)th field only is utilized for interpolation, unlike the system shown in FIG. 1A.

Figure 16:
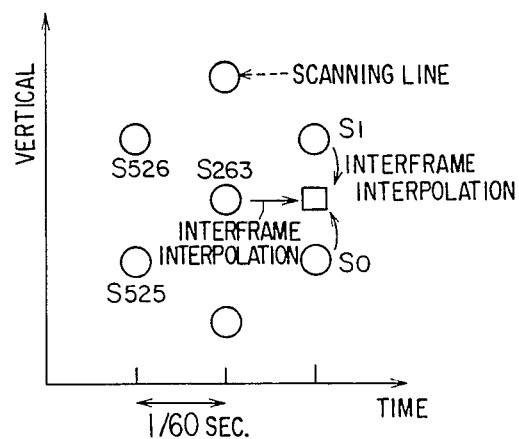
FIG. 16 is a graph showing a manner of scanning line interpolation in the system shown in FIG. 15.
Figure 17:
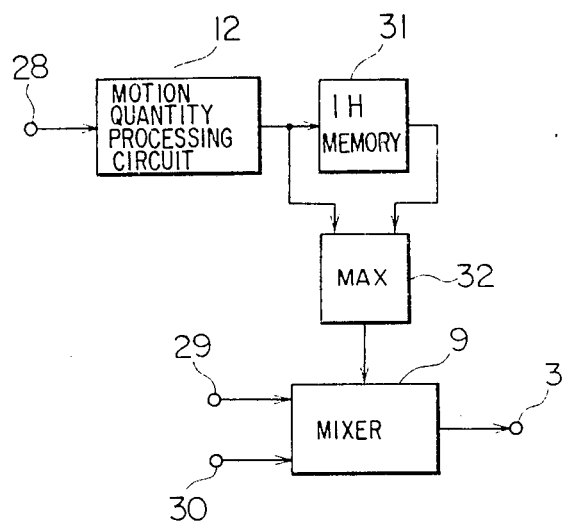
FIG. 17 is a block diagram showing the structure of another embodiment of the present invention applicable to the system shown in FIG. 15.

In the system shown in FIG. 15, the signal representing the quantity of motion and generated from the motion detecting circuit 11 is based on the difference between the signals $S_0$ and $S_{525}$ shown in FIG. 16. Since the signals $S_0$ and $S_{525}$ are displaced vertically downward by one line from the position of the scanning line signal to be interpolated, a circuit as shown in FIG. 17 may be added to the system shown in FIG. 15. Referring to FIG. 17, the circuit includes a signal input terminal 28 of the motion quantity processing circuit 12 connected to the motion detecting circuit 11, a moving picture signal input terminal 29, a still picture input terminal 30, a line memory 31 delaying the output signal of the circuit 12 by 1H, and a maximum value circuit 32 calculating the maximum values of the quantities of motion of picture elements in adjacent scanning lines. The symbols 3 and 9 are the same as those shown in FIG. 15. When the circuit shown in FIG. 17 is added to the system shown in FIG. 15, motion of a picture at the time of the preceding line, that is, the difference between the signals $S_1$ and $S_{526}$ in FIG. 16 is also taken into account in the calculation by the maximum value circuit 32, and the mixer 9 is controlled according to the quantity of motion representing the difference between the scanning lines $S_1$ and $S_0$ upper and lower than the scanning line to be interpolated. Therefore, the possibility of mistaking a moving picture to be a still picture can be reduced to prevent undesirable degradation of the picture quality. The maximum value circuit 32 may, for example, be an adder.

In the aforementioned embodiments of the present invention, the attenuator 17 may be disposed before the field memory 18 or after the second horizontal filter 16.

The signal representing the quantity of motion obtained by the circuit of the present invention can be used to control a Y/C separation circuit of motion adaptive type in addition to its application to the control of a scanning line interpolating circuit of motion adaptive type as described above.

Figure 18:
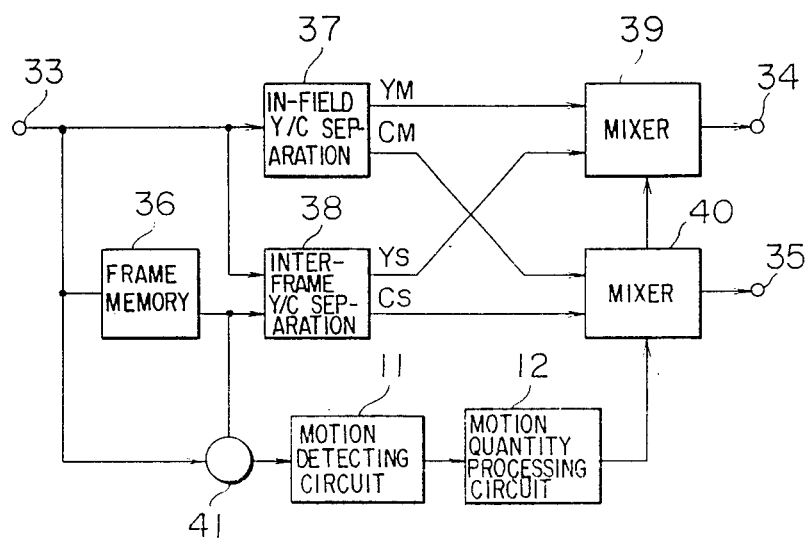
FIG. 18 is a block diagram showing still another system construction to which the present invention is applicable.

FIG. 18 shows application of the video signal processing circuit of motion adaptive type of the present invention to a Y/C separation circuit. The system shown in FIG. 18 includes a video signal input terminal 33, a luminance signal output terminal 34, a color signal output terminal 35, a frame memory 36, an in-field Y/C separation circuit 37, an interframe Y/C separation circuit 38, mixers 39, 40, and a subtractor 41 generating an interframe difference signal.

In the system shown in FIG. 18, in response to the application of the output signal of the motion quantity processing circuit 12 described above, output signals of the in-field and interframe Y/C separation circuits 37 and 38 are mixed in the mixers 39 and 40, so that a luminance signal and a color signal processed in an optimum manner appear at the respective output terminals 34 and 35. Since an optimum control signal according to the present invention is applied to the mixers 39 and 40, the luminance signal and the color signal are separated most appropriately.

It will be understood from the foregoing detailed description that the video signal processing circuit of motion adaptive type according to the present invention includes a motion quantity processing circuit which prevents undesirable degradation of picture quality due to an erroneous control attributable to incomplete detection of motion, so that a picture of high quality free from any interference can be displayed.

We claim:

1. A video signal processing circuit of motion adaptive type including a circuit for identifying motion of a picture in a video signal on the basis of a difference signal between a line signal appearing in an M-th field and a corresponding line signal appeared in at least an (M−2)th field so that a video signal is processed in a different manner depending on whether a portion of the video signal to be displayed is a still picture or a moving picture, said motion identifying circuit comprising:
   an attenuating circuit attenuating a first signal coresponding to said difference signal;
   field delay means for substantially delaying said first signal by one field;
   an output circuit generating, on the basis of a second signal associated with said first signal and the output signal of said field delay means, a third signal representing motion of said picture; and a horizontal filter spreading at least one of said first, second and third signals in the horizontal direction by receiving said signal as an input signal.

2. A video signal processing circuit according to claim 1, wherein said field delay means is a field memory.

3. A video signal processing circuit according to claim 1, wherein said output circuit is a maximum value circuit selecting a larger one of said first and second signals.

4. A video signal processing circuit according to claim 1, wherein said output circuit is means for adding said first and second signals.

5. A video signal processing circuit according to claim 1, wherein said horizontal filter receives said difference signal as an input signal and generates said first signal.

6. A video signal processing circuit according to claim 1, wherein said horizontal filter receives said third signal from said output circuit as an input signal and generates said signal identifying motion of said picture.

7. A video signal processing circuit according to claim 1, further comprising line delay means for delaying the output signal of said field delay means by one line, and wherein said output circuit receives a fourth signal generated from said line delay means as an input signal and generates a signal identifying motion of said picture.

8. A video signal processing circuit according to claim 7, wherein said line delay means is a line memory.

9. A video signal processing circuit according to claim 1, wherein said horizontal filter includes a group of plural cascade-connected delay elements delaying said input signal by one picture element during horizontal scanning, and means for synthesizing the individual output signals of said delay elements appearing at least at the connection points between said delay elements.

10. A video signal processing circuit according to claim 9, wherein said synthesizing means includes means for weighting the individual output signals of said delay elements and means for synthesizing the output signals of said weighting means.

11. A video signal processing circuit according to claim 9, wherein said synthesizing means is a maximum value circuit selecting maximum values of the output signals of said delay elements.

12. A video signal processing circuit according to claim 9, wherein said synthesizing means is an adder adding the output signals of said delay elements.

13. A video signal processing circuit of motion adaptive type including a circuit for identifying motion of a picture in a video signal on the basis of a difference signal between a line signal appearing in an M-th field and a corresponding line signal appeared in at least an (M−2)th field so that a video signal is processed in a different manner depending on whether a portion of the video signal to be displayed is a still picture or a moving picture, said motion identifying circuit comprising:
   a first circuit generating a first signal corresponding to said difference signal;
   a second circuit including a cascade connection of an attenuating circuit attenuating its input signal and field delay means substantially delaying said input signal by one field;
   an output circuit generating, on the basis of said first signal and a second signal applied from said second circuit, a third signal representing motion of said picture;

a horizontal filter inserted in at least one of said first circuit, said second circuit and said output circuit to spread an input signal of said one of said first and second circuits in the horizontal direction; and a feedback circuit feeding back said third signal from said output circuit as said input signal to said second circuit.

14. A video signal processing circuit according to claim 13, further comprising line delay means connected to the output of said second circuit for delaying the output signal of said second circuit by one line, and wherein said output circuit generates said third signal on the basis of said first and second signals and the output signal of said line delay means.

15. A video signal processing circuit according to claim 13, wherein said horizontal filter is connected to the output of said output circuit, and said feedback circuit feeds back one of said third signal and the output signal of said horizontal filter as said input signal to said second circuit.

* * * * *